United States Patent [19]

Garland

[11] Patent Number: 4,756,411
[45] Date of Patent: Jul. 12, 1988

[54] MARKETING SYSTEM FOR APPARATUS FOR CHANGING ENGINE OIL

[76] Inventor: Everett D. Garland, 2447 Scott Ct., Longmont, Colo. 80501

[21] Appl. No.: 104,444

[22] Filed: Oct. 2, 1987

Related U.S. Application Data

[63] Continuation-in-part of Ser. No. 714,434, Mar. 21, 1985, abandoned, and Ser. No. 843,138, Mar. 24, 1986, abandoned.

[51] Int. Cl.⁴ .................. B65B 39/00; B65D 81/36
[52] U.S. Cl. ......................... 206/223; 141/98; 184/106; 220/1 C; 220/23.8; 220/72
[58] Field of Search .................. 141/98, 326, 364; 184/1.5, 106; 190/117; 206/45.31, 223; 220/1 C, 23.4, 23.8, 23.83, 20, 20.5, 70, 72

[56] References Cited

U.S. PATENT DOCUMENTS

| Re. 27,499 | 8/1972 | Bartz | 220/1 C |
|---|---|---|---|
| 3,115,228 | 12/1963 | Louik et al. | 190/117 |
| 3,301,429 | 1/1967 | McClain | 220/23.83 |
| 3,410,438 | 11/1968 | Bartz | 220/1 C |
| 3,552,599 | 1/1971 | Redding | 220/72 |
| 3,703,956 | 11/1972 | Oswalt | 220/1 C |
| 3,942,671 | 3/1976 | Florian | 220/72 |
| 4,005,799 | 2/1977 | Mannaerts | 220/288 |
| 4,010,863 | 3/1977 | Ebel | 220/1 C |
| 4,054,184 | 10/1977 | Marcinko | 184/1.5 |
| 4,069,969 | 12/1977 | Black | 184/1.5 |
| 4,098,398 | 7/1978 | Meyers | 184/106 |
| 4,162,010 | 7/1979 | Hovesepian | 206/229 |
| 4,296,838 | 10/1981 | Cohen | 184/104 |
| 4,301,841 | 11/1981 | Sandow | 141/98 |
| 4,403,692 | 9/1983 | Pollacco | 206/223 |
| 4,488,584 | 12/1984 | Hestehave et al. | 141/339 |
| 4,526,286 | 7/1985 | Jung et al. | 220/72 |

FOREIGN PATENT DOCUMENTS

2049989  4/1972  Fed. Rep. of Germany ........ 220/72

Primary Examiner—Jimmy G. Foster
Attorney, Agent, or Firm—Klaas & Law

[57] ABSTRACT

A package for marketing apparatus useful in draining used engine oil from and adding new oil to an automobile wherein the package contains containers of new oil and container means into which the used engine oil is drained. The container means is disposable and is constructed so that it may be positioned under the oil pan, have the used oil deposited on its upper surface for draining into an internal cavity and then sealed for ready disposal.

15 Claims, 5 Drawing Sheets

MARKETING SYSTEM FOR APPARATUS FOR CHANGING ENGINE OIL

This application is a continuation-in-part of U.S. patent application Ser. No. 714,434 filed Mar. 21, 1985, now abandoned, and U.S. patent application Ser. No. 843,138, filed Mar. 24, 1986, now abandoned.

FIELD OF THE INVENTION

This invention relates to the marketing of a plurality of items to be used together wherein the plurality of items are confined within one package and more particularly to the marketing of apparatus useful in the changing of engine oil, such as automobile engine oil, wherein the new cans of oil, a new oil filter and container means for collecting and holding the used engine oil are all packaged as one unit which may be conveniently disposed of in conventional means as desired.

BACKGROUND OF THE INVENTION

In recent years, more and more people are changing the engine oil and replacing the oil filter in their own cars. In fact, a recent survey discloses that over 55% of all oil and oil filter changes are now done by the car owner. Though the actual function of removing a filter or drain plug is relatively simple, each do-it-yourselfer has been and still is confronted with the handling and disposing of the crankcase drainings. The oil and filter industry serving the do-it-yourself market recognizes the need for an inexpensive container that will provide a convenient drainpan and disposable container to handle crankcase drainings.

Several different products have been marketed supposedly designed to perform the drain and disposal function. One such product, marketed by Perfect Equipment Corporation consisted of a cardboard box containing an absorbant similar to oil dry, with a wax impregnated inner surface on the cardboard box to prevent leaking. This product met with little success. Another type of product was one disclosed in U.S. Pat. No. 4,064,969 and consisted of a plastic bag attached to a fold-up collar. In use the collar is opened and located under the oil pan. The plastic bag is separated and oil allowed to drain therein. Difficulties encountered with product relate to difficult to form the collar, difficult to remove from under the car after filling with the used engine oil and the ever present danger of the thin plastic ripping and the consequent spilling of the oil or in leakage of the used engine oil through the tied neck. Another type of product is that disclosed in U.S. Re. Pat. No. 27,449 which is provided with a small vent opening in a sloping side wall leading from the upper surface to the handle means. On problem associated with this container is that it does not handle the initial surge of oil from the oil pan of the engine. Also, the size and the cost of the product eliminated it from the drain and dispose concept. After use of this container, the outside surface still had residue oil on it that remains there until the next use. Another type of product is that disclosed in U.S. Pat. No. 4,301,841 which discloses a multipurpose container in which new oil is stored in the container. Also, one surface of the container may be used to drain used engine oil from an engine oil pan wherein vent means are incorporated in the container. A problem associated with this product is that the used oil must be drained before the new oil is used. In the product of this patent, the new oil is in the container so that there is no place in which to drain the used engine oil from the oil pan.

SUMMARY OF THE INVENTION

This invention is directed to a package for the marketing of apparatus useful in changing the engine oil, such as automobile engine oil, wherein the new cans of oil, a new oil filter and container means for collecting and holding the used engine oil are all packaged as one unit by transparent wrapping means so as to be available in one attractive package. When it is desired to change the engine oil, the transparent wrapping is removed and a large splatter bib which contains directions for the complete operations is spread under the engine oil pan. The container means will be positioned under the engine oil pan in accordance with the instructions on the splatter bib, the appropriate plugs removed and the used oil drained from the engine oil pan onto the upper surface of the container means which used oil then flows through a drain opening into the container means. The used oil filter is removed and the new oil filter is positioned in its place. All of the plugs are then replaced. The new cans of oil are then added through the oil filler. The splatter bib may be then collected so that the empty cans and the container means are enclosed thereby and conveniently dropped in a refuse collector.

In one embodiment of the invention, the container means includes a lower flat support surface to enable the positioning of the container means under the engine oil pan. The upper surface of the container means includes a rim portion and downwardly inclined wall portions leading to a drain opening located at the lowermost portion of the upper surface. A removable member is provided so that the drain opening may be in an opened or closed position. The container means is provided with a pair of opposed end wall portions and a pair of opposed side wall portions. A vent opening is provided in one corner of the upper surface with the vent opening having an opening having a cross-sectional area sufficiently large in relation to the cross-sectional area of the drain opening so that the drain opening is able to receive and drain the initial surge of oil from the engine oil pan. A removable member is also provided for the vent means so that the opening therein may be in an opened or closed position. In a more preferred embodiment, the distance between the uppermost portion of the drain means and the lower flat support surface is less than the distance between the lowermost portion of the vent opening and the lower flat support surface.

The upper surface of the container means is provided with a plurality of support means which are dimensioned to receive and support a plurality of new containers of oil. In this application, the containers are identified as cans but it is understood that other types of containers, such as disposable bottles, are included within such terminology. Also, additional support means are provided in the upper surface of the container means and are dimensioned to receive and support a container with a new oil filter therein. In making the package, the new cans of oil and a new oil filter are nested in the appropriate support means, the splatter bib is added and then everything is wrapped within a transparent material.

In another embodiment of the invention, the volume defined by the rim portion, the downwardly inclined wall portions and the upper surface of the container means is sufficient to hold at least three quarts of oil and may be designed to be sufficient to hold at least five quarts of oil. The downwardly inclined wall portions are of a height sufficient to inhibit undesirable splattering of the used engine oil as it drains from the oil pan onto the upper surface. Also, at least two drain holes are provided to ensure that the used engine oil can drain into the inner cavity of container means. A further feature relates to support pillars formed in the bottom support surface which support pillars extend upwardly and have upper surfaces having a significant surface area in contact with the lower portion of the upper surface of the container. In the marketing of engine oil change packages of this invention, the packages having container means with the new containers of oil will be placed one on top of another. The support pillars are designed to provide adequate support strength to prevent the collapse or cracking of the upper surface of each container means under such marketing conditions. In another embodiment of the invention, the new containers of oil are located on opposite sides of the drain portion of the container means.

It is an object of this invention to provide container means which may be used when changing the engine oil, particularly of an automobile engine, so that the used engine oil may be readily drained from the engine oil pan into the container means without undue spillage.

It is a further object of this invention to provide container means which may be used when changing the engine oil, particularly of an automobile engine, so that the used engine oil may be readily drained from the engine oil pan into the container means without undue spillage and which container means is disposable.

It is another object of this invention to provide apparatus useful in the changing of engine oil, such as automobile engine oil, wherein the new cans of oil, a new oil filter and container means for collecting and holding the used engine oil are all packaged as one unit.

It is a still further object of this invention to provide a container means which may be used when changing engine oil which minimizes splatter and ensures that the drained used oil will flow into the inner cavity of the container means.

It is still another object of this invention to provide apparatus useful in the changing of engine oil, such as automobile engine oil, wherein the new cans of oil, a new oil filter and container means for collecting and holding the used engine oil are all packaged as one unit and wherein all of the apparatus is disposable.

Other objects and advantages of this invention will be apparent from the following more particular description of the preferred embodiments as illustrated in the accompanying drawings in which like reference characters refer to the same part throughout the various views. The drawings are not necessarily to scale, emphasis instead being placed upon illustrating the principles of the invention.

DETAILED DESCRIPTION OF THE INVENTION

Figure 1:
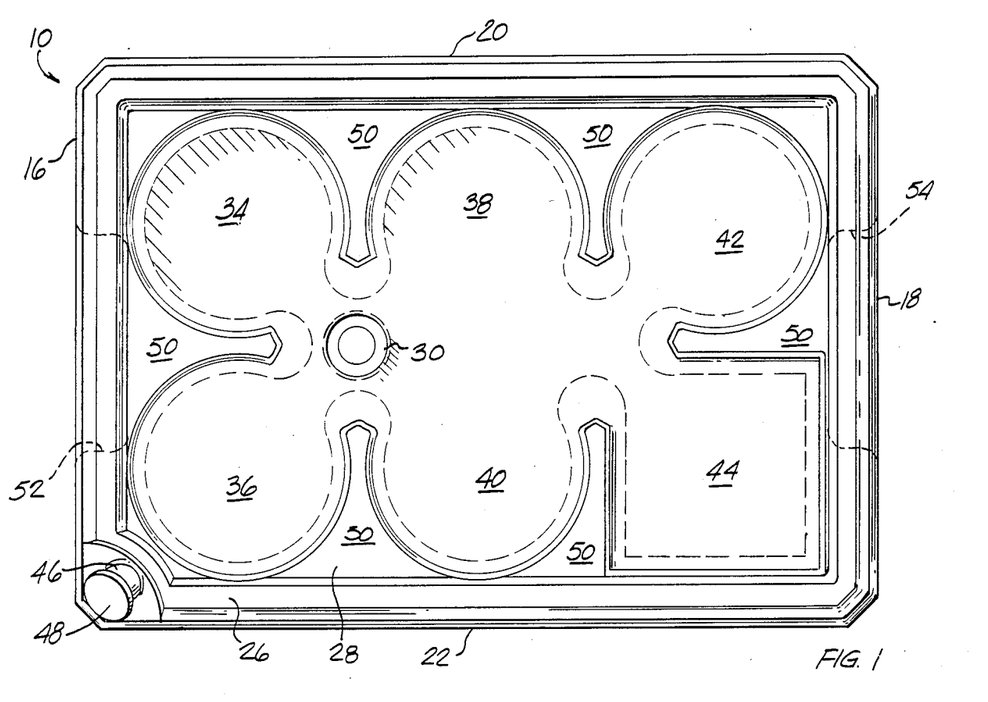
FIG. 1 is a top plan view of one embodiment of the container means of this invention.
Figure 2:
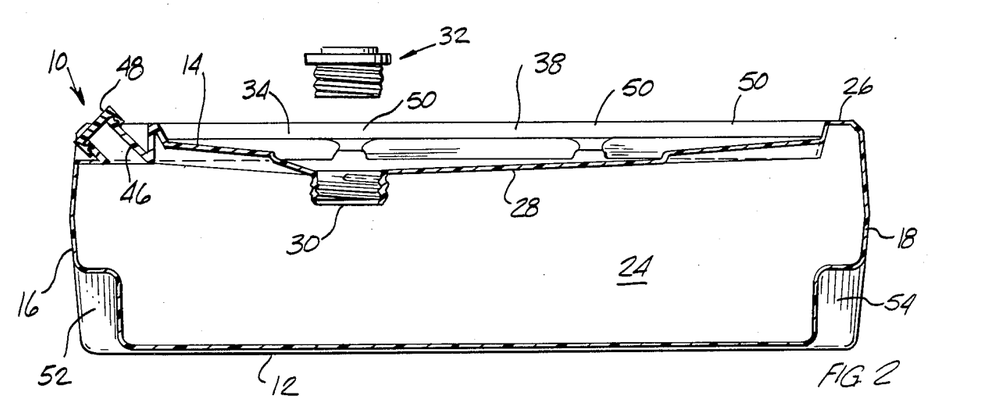
FIG. 2 is a side elevation of FIG. 1.
Figure 3:
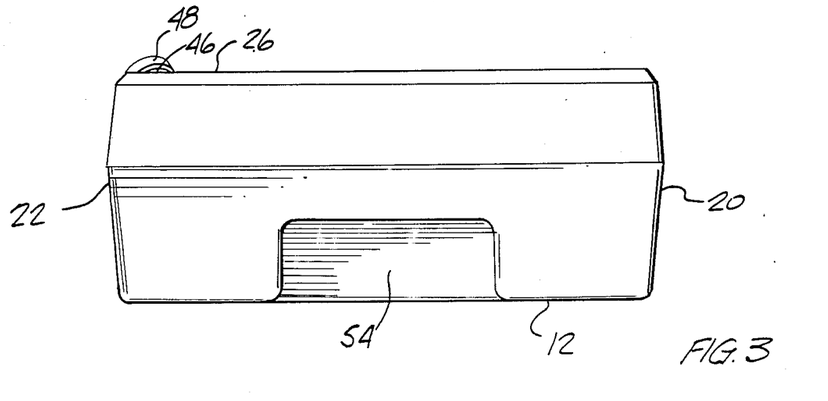
FIG. 3 is an end view of FIG. 1.

As illustrated in FIGS. 1–3, the apparatus comprises a rigid, self-supporting container, preferably formed from a plastic or other similar material, means 10 having a lower flat support surface 12 and an upper surface 14 located opposite to the lower flat support surface 12. The container means is provided with a pair of opposed end wall portions 16 and 18 and a pair of opposed side wall portions 20 and 22 which define an inner cavity 24. The upper surface 14 includes a rim portion 26 surrounding a downwardly offset and centrally inclined portion 28 to form a sump above a threaded drain opening 30 located at the lowest portion of the upper surface so that any used engine oil deposited on the upper surface 14 will flow downwardly toward and through the drain opening 30 into the cavity 24. A threaded plug member 32 is provided for closing the drain opening 30. Means (not shown) are provided to partially close the bottom of the drain opening 30 so that, if the drain plug from the oil pan is accidentally dropped, it will not fall into the container 10.

The upper surface 14 is also provided with a plurality of projections forming arcuate pockets 34, 36, 38, 40 and 42 which are dimensioned so as to snugly receive in a friction fit the lower portion of a new can of oil. Another pocket 44 is provided in the upper surface 14 and is dimensioned to receive in a friction fit the lower portion of a container holding a new oil filter.

A threaded vent opening 46 is provided in one corner of the upper surface 14 and a threaded cap member 48 is provided so as to open or close the vent opening 46. In the preferred embodiment of the invention, the cross-sectional area of the vent opening 46 is sufficiently large in relation to the cross-sectional area of the drain opening 30 so that the drain opening 30 will be able to handle the initial surge of used engine oil from the engine oil pan without any of the used engine oil flowing over the rim 26. As noted particularly in FIG. 2, the sections 50 between the pockets 34, 36, 38, 40, 42 and 44 are all inclined downwardly so that any used engine oil falling on these sections 50 will flow downwardly toward the drain opening 30. The cross-sectional area of the vent opening 46, in order to accomplish the foregoing function, is substantially equal to the cross-sectional area of the drain opening 30. Also, in the preferred embodiment, the distance between the uppermost portion of the drain opening 30 and the lower flat support surface 12 is less than the distance between the lowermost portion of the vent opening 46 and the lower flat support surface 12. The opposite end wall portions 16 and 18 of the container means 10 are each provided with inwardly offset portions 52 and 54 to provide handle means for carrying the container means 10.

Figure 4:
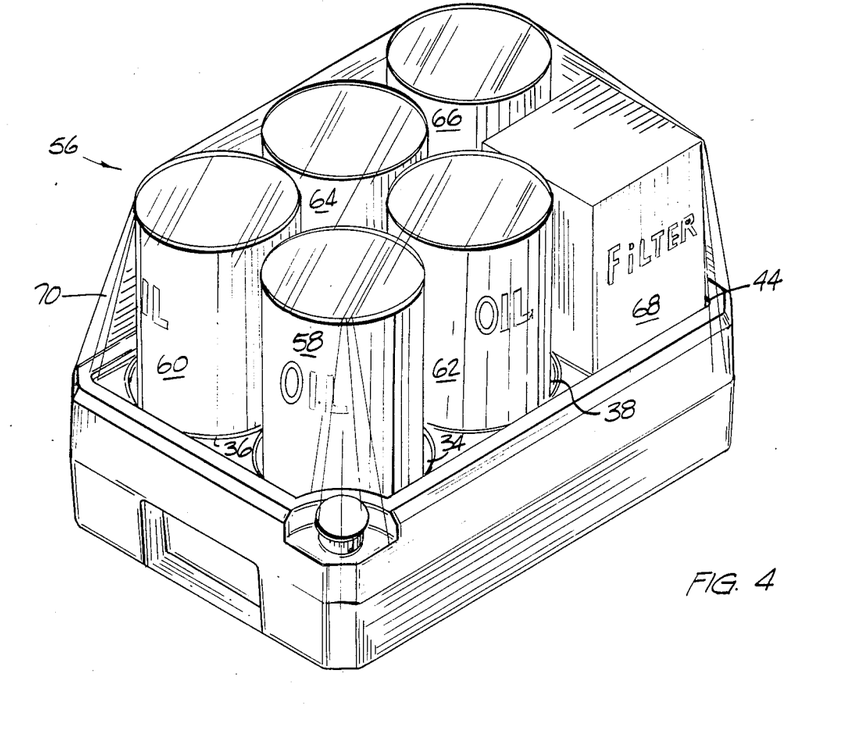
FIG. 4 is a pictorial view of a package of this invention.

In FIG. 4, there is illustrated the package 56 which will be used to market the apparatus of this invention.

New cans 58, 60, 62, 54 and 66 of oil have been nested into the arcuate pockets 34, 36, 38, 40, 42 and a container 68 in which a new oil filter is enclosed has been nested into the pocket 44. A transparent wrapping 70 has been positioned around the new cans of oil, the oil filter container and the container means so as to provide an attractive package that can readily be displayed in the market place. Also included in the package would be a splatter bib (not shown) having a cross-sectional area substantially greater than the largest cross-sectional area of the container means 10. The splatter bib is made from an absorbent material and is adapted to be placed on the surface under the crankcase from which the used engine oil is to be drained. Printed on the splatter bib is a diagram illustrating where to position the container means 10 in relation to the drain hole in the engine oil pan. Also, instructions for the entire operations are provided on the splatter bib.

In use, the package 56 comprising the new cans of oil, the new oil filter, the splatter bib and the container means is displayed and sold in a retail store. The customer purchases the entire package and transports the package to a residence location or the like where it is desired to drain the used engine oil from an engine, such as an automobile engine, and to add new oil. Also, at the same time, the used oil filter is removed and replaced by a new oil filter. When the customer is ready to perform the operation, the package 56 is opened and the new cans of oil 58, 60, 62, 64 and 66 are removed from the container means 10 and the container 68 with the new oil filter is also removed from the container means 10. The splatter bib is opened an the directions for the entire operations are studied. The splatter bib is positioned under the crankcase of the automobile from which the used engine oil is to be drained. The threaded plug member 32 is removed from the drain opening 30 and the threaded cover 48 is removed from the vent opening 46. The capacity of the container means 10 is great enough so that the level of the used engine oil drained into the cavity 24 of the container means 10 will not reach the level of the vent opening 46 when the container means 10 is being supported on the lower flat support surface 12. Also, by locating the vent opening 46 in the upper surface 14 and with the uppermost distance between the portion of the drain opening 30 and the lower flat support surface 12 being less than the distance between the lowermost portion of the vent opening 46 and the lower flat support surface 12, there is little or no tendency for the used oil to spill out of the container even where the surface on which the container is supported is inclined. The container means 10 is then positioned on the splatter bib in accordance with the instructions on the splatter bib. The drain plug is then removed from the engine oil pan of the automobile and the used engine oil is permitted to flow onto the upper surface 14 of the container means 10. The used engine oil flows over the upper surface 14 of the container means 10 and drains into the cavity 24 through the drain opening 30. As stated above, the drain opening 30 and the vent opening 46 are dimensioned so as to cooperate in readily handling the initial surge of the used engine oil from the engine oil pan. The used oil filter is removed from the engine block and the new oil filter is positioned in its place. When the used engine oil has finished draining from the engine oil pan, the drain plug is inserted back into the engine oil pan to prevent any more flow through the opening in the engine oil pan. Each new can of oil is then opened and poured into the engine through the conventional oil filler means located on each engine. The plug member 32 is then threadedly secured in the drain opening 30 and the cover 48 is threadedly secured to the vent 46. If desired, this latter operation may be done prior to adding the new oil.

The container means 10 having the used oil stored therein, the empty cans of oil and the used oil filter may be wrapped in the splatter bib and placed in a refuse container. If desired, there items could be placed separately in a refuse container.

One of the problems confronting the do-it-yourselfer is how to dispose of the used engine oil. This is also a problem to the ecologists and the oil reclaim industry. It is being proposed to establish oil reclaim or recycle stations similar to those now existing for aluminum can recycling stations. The container of this invention is ideally suited for this operation. The used oil station would have a compactor into which the containers and the used engine oil contained therein would be deposited As the container was being shredded and compacted, the used engine oil would be drained into a reclaimed oil holding tank. Suitable means could be provided to dispense compensation for the used engine oil.

The rigid, self-supporting means of this invention is preferably formed in a blow molding operation using a high density polyethylene having resistance to engine acids and oil characteristics. In the preferred embodiment, the container means 10 has a length in the range of about 13–17 inches, and preferably about 15 inches, a width in the range of about 9–13 inches, and preferably about 10.5 inches, and an overall height in the range of about 2.75–4.5 inches, and preferably about 3.25 inches. The drain opening 30 and the vent 46 each have an inside diameter in the range of about 1.15 inches. The dimensions of the container are related to each other to ensure that the container has a capacity great enough so that all of the used engine oil may be drained without spillage through the vent. The volume formed by the downwardly offset and inwardly inclined portion 28 should be great enough to cooperate with the vent opening 30 in retaining the initial surge of used engine oil in the sump without undue spillage. The projections forming the pockets 34, 36, 38, 40, 42 and 44 extend upwardly from the adjacent portions of the upper surface 14 in the range of about 0.062 to 0.1875 inch and preferably about 0.125 inch. The splatter bib has a length in the range of about 34–40 inches, and preferably about 36 inches, and a width in the range of about 28–34 inches, and preferably about 30 inches.

Another modification of the invention is illustrated in FIGS. 5–8 wherein the apparatus comprises a rigid, self-supporting container means 70, preferably formed from a plastic or other similar material, having a lower flat support surface 72 and an upper surface 74 located opposite to the lower flat support surface 72. The container means 70 is provided with a pair of opposed end wall portions 76 and 78 and a pair of opposed side wall portions 80 and 82 which define an inner cavity 84. The upper surface 74 includes a rim portion 86 surrounding a downwardly offset and centrally inclined portion 88 to form a sump above a pair of spaced apart threaded drain openings 90 and 92 located at the lowest portion of the upper surface 74 so that any used engine oil deposited on the upper surface 74 will flow downwardly toward and through the drain openings 90 and 92 into the cavity 84. Threaded plug members 94 and 96 are provided for closing the drain openings 90 and 92. A plurality of side walls 98, 100, 102 and 104 extend upwardly from the upper surface 74 and terminate at the rim portion 86. These side walls 98, 100, 102 and 104 cooperate with the upper surface 74 to form a used engine oil receiving means having a volume sufficient to hold at least three quarts of used engine oil and, if desired, a volume to hold at least five quarts of used engine oil. Also, the side walls 98, 100, 102 and 104 extend upwardly for a distance great enough to function to retain a substantial portion of any splatter, when the used engine oil is deposited on the upper surface 74 within the used engine oil receiving means. The cross-sectional configuration of each drain openings 90 and 92 is smaller than the cross-sectional configuration of the drain plug conventionally associated with the oil pan of a vehicle so that, if the drain plug is accidentally dropped, it will be retained in one of the drain openings 90 or 92 so that the used engine oil will be free to drain through the other of the drain openings 90 or 92 into the inner cavity 84.

Figure 7:
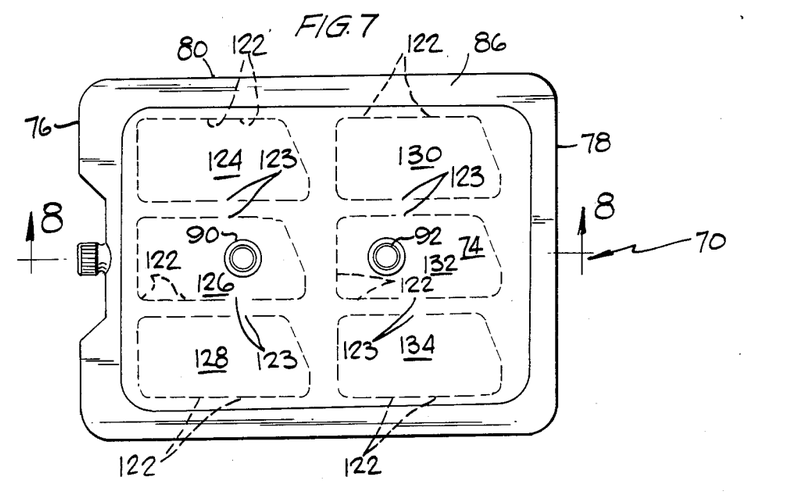
FIG. 7 is a top plan view of FIG. 5 with the oil containers, the transparent cover and the carrying strap removed.
Figure 8:
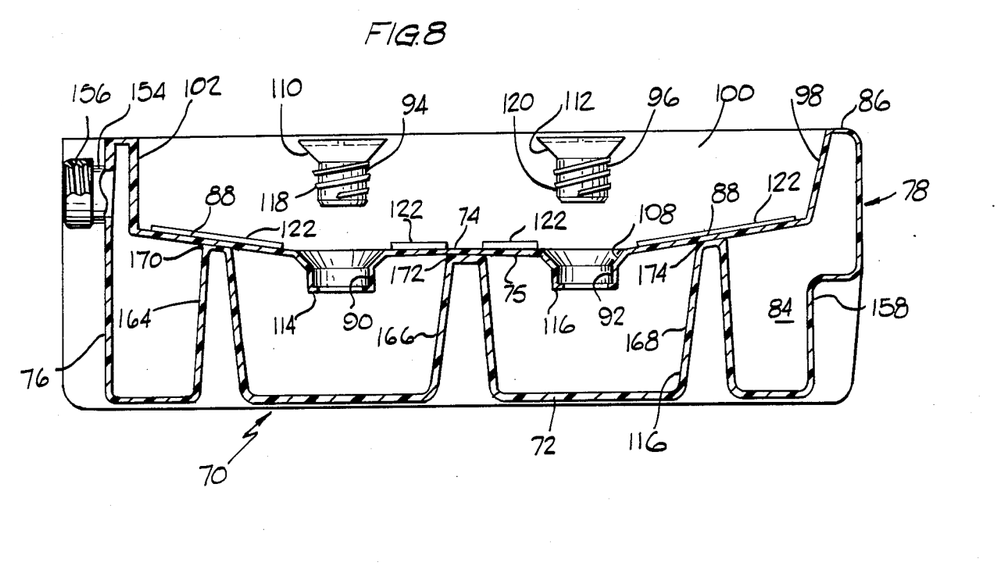
FIG. 8 is a cross-sectional view of the container means taken on the line 8—8 of FIG. 7.

The drain openings 90 and 92 have conical surfaces 106 and 108 and the plug members 94 and 96 have complementary conical surfaces 110 and 112. Annular, inwardly directed flanges 114 and 116 are formed on the drain openings 90 and 92 and the plug member 94 and 96 are provided with external threads 118 and 120. After the used engine oil has been drained into the inner cavity 74, the plug members 94 and 96 are threaded onto the flanges 114 and 116 and tightened so as to draw the conical surfaces 106, 108, 110 and 112 into contacting relationship so as to form a seal to prevent the used engine oil from leaking out of the inner cavity 74.

The upper surface 74 is also provided with a plurality of spaced apart ribs 122 projecting outwardly therefrom and forming pockets 124, 126, 128, 130, 132 and 134 which are dimensioned so as to provide a support for the new containers 136, 138, 140, 142, 144 and 146 of oil. The ribs 122 have suitable openings 123 to allow the drained oil to flow to the drain openings 90 and 92. A transparent cover 148 is provided to fit over the containers of new oil and a portion of the container means 70. The transparent cover 148 has a plurality of pockets 150 which are shaped similarly to the new containers. The pockets 150 and the spaced apart ribs 122 cooperate to hold the containers of new oil in position on the upper surface 74 during shipment and storage. A strap 152 is provided for convenience in carrying the package illustrated in FIG. 5. The ribs 122 are spaced apart a sufficient distance to allow for draining of the used engine oil over the upper surface 74.

A threaded vent opening 154 is provided in the wall 76 and a threaded cap member 156 is provided so as to open or close the vent opening 154. In the preferred embodiment of the invention, the cross-sectional area of the vent opening 154 is sufficiently large in relation to the cross-sectional area of the drain openings 90 and 92 so that the drain openings 90 and 92 will be able to handle the initial surge of used engine oil from the engine oil pan without any of the used oil flowing over the rim 86. The distance between the uppermost portion of the drain openings 90 and 92 and the lower flat support surface 72 is less than the distance between the lowermost portion of the vent opening 154 and the lower flat support surface 72. The end wall portion 78 of the container means 70 is provided with inwardly offset portion 158 to cooperate with the vent 154 in providing handle means for carrying the container means 70.

Figure 5:
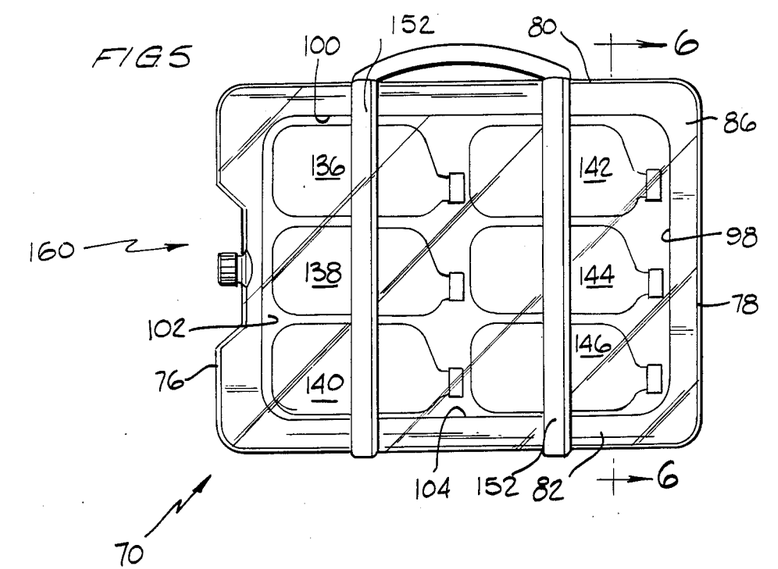
FIG. 5 is a top plan view of another embodiment of this invention.
Figure 6:
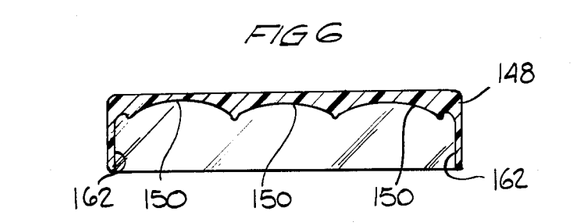
FIG. 6 is a cross-sectional view illustrating only the transparent cover of FIG. 5 taken on the line 6—6 of FIG. 5.

In FIG. 5, there is illustrated the package 160 which will be used to market the apparatus of this invention. New containers 136-146 of oil have been nested into the pockets 124-134. A transparent cover 148 has been positioned around the new containers of oil with the lower portions of the inner surface 162 thereof having a friction fit with the adjacent portions of the outer surface of the container means 70 immediately below the rim portion 86. Also illustrated in FIG. 8 are a plurality of support pillars 164, 166 and 168 formed in the lower flat support surface 72 and extending upwardly towards the upper surface 74. These support pillars are shaped as frustums of a cone and have upper surfaces 170, 172 and 174 adapted to contact the bottom surface 75 of upper surface 74. The support pillars 164, 166 and 168 are integral with the lower flat support surface 72 and have continuous integral side wall portions 165, 166 and 167 which are integral with the continuous upper surfaces 170, 172 and 174, each of the upper surfaces having a significant surface area in contact with the bottom surface 75. The support pillars 164, 166 and 168 are designed to provide adequate support for the upper surface 74 of the container means when packages of new containers of oil and container means are stacked one on top of another for marketing and display purposes so as to prevent the sagging or rupture of the upper surface 74.

The apparatus illustrated in FIGS. 5-8 is used in a manner similar to that apparatus illustrated in FIGS. 1-4 as described above.

The rigid, self-supporting means of the embodiment of FIGS. 5-8 also is formed, as described above in relation to FIGS. 1-4, in a blow molding operation using a high density polyethylene having resistance to engine acids and oil characteristics. In this embodiment, the container means 70 has an overall length of about 18.5 inches, an overall width of about 15.25 inches, and an overall height of about 4.75 inches. The distance between the side walls 98 and 102 is about 16.0 inches, the distance between the side walls 100 and 104 is about 13.0 inches and the depth of each of the side walls 98, 100, 102 and 104 is about 2.00 inches.

Figure 9:
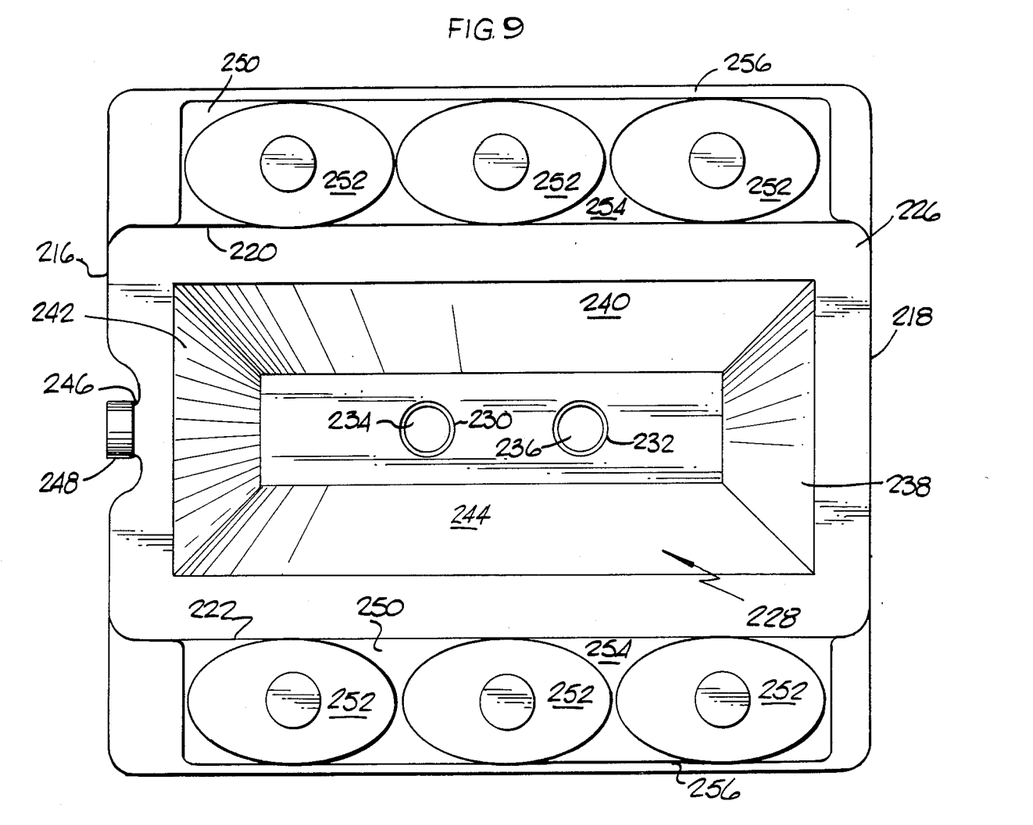
FIG. 9 is a top plan view of another embodiment of the invention.
Figure 10:
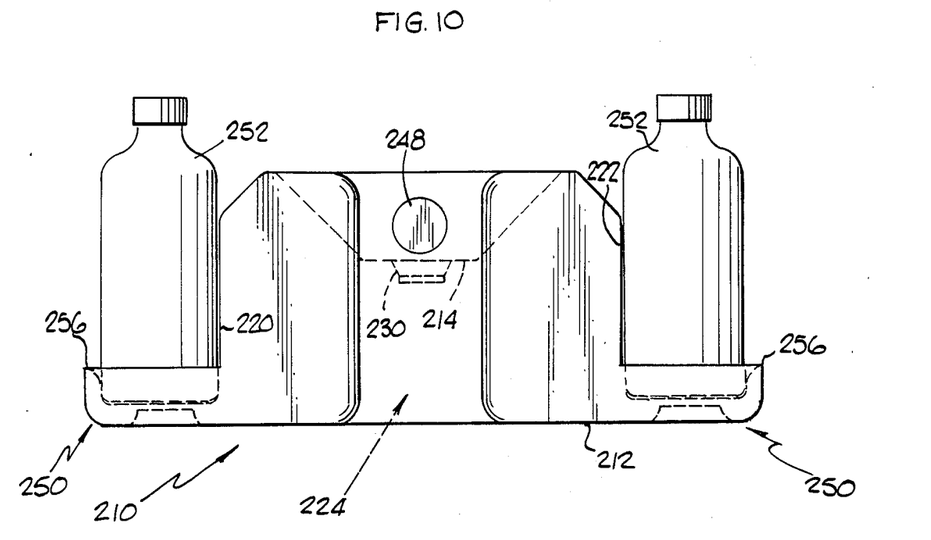
FIG. 10 is a left side elevational view of FIG. 9.

Another embodiment of the invention is illustrated in FIGS. 9-11 and comprises a rigid, self-supporting container means 210, preferably formed from a plastic or similar material, having a lower flat support surface 212 and an upper surface 214 located opposite to the lower support surface 212.

The container means 210 is provided with a pair of opposed end wall portions 216 and 218 and a pair of opposed side wall portions 220 and 222 which define an inner cavity 224. The upper surface 214 includes a rim portion 226 surrounding a downwardly offset and centrally inclined portion 228 to form a sump above a pair of spaced apart threaded drain openings 230 and 232 located at the lowest portion of the upper surface 214 so that any used engine oil deposited on the upper surface 214 will flow downwardly toward and through the drain openings 230 and 232 into the cavity 224. Threaded plug members 234 and 236 are provided for closing the drain openings 230 and 232. A plurality of side walls 238, 240, 242 and 244 extend upwardly from the upper surface 214 and terminate at the rim portion 226. These side walls 238, 240, 242 and 244 cooperate with the upper surface 214 to form a used engine oil receiving means. The side walls 238, 240, 242 and 244 extend upwardly for a distance great enough to function to retain a substantial portion of any splatter, when the used engine oil is deposited on the upper surface 214 within the used engine oil receiving means. The cross-sectional configuration of each drain openings 230 and 232 is smaller than the cross-sectional configuration of the drain plug conventionally associated with the oil pan of a vehicle so that, if the drain plug is accidentally dropped, it will be retained in one of the drain openings 230 or 232 so that the used engine oil will be free to drain through the other of the drain openings 230 or 232 into the inner cavity 224.

A threaded vent opening 246 provided in the wall 216 and a threaded cap member 248 is provided so as to open or close the vent opening 246. In the preferred embodiment of the invention, the cross-sectional area of the vent opening 246 is sufficiently large in relation to the cross-sectional area of the drain openings 230 and 232 so that the drain openings 230 and 232 will be able to handle the initial surge of used engine oil from the engine oil pan without any of the used oil flowing over the rim 226. The distance between the uppermost portion of the drain openings 230 and 232 and the lower flat support surface 212 is less than the distance between the lowermost portion of the vent opening 246 and the lower flat support surface 212.

Extending outwardly from the side wall portions 220 and 222 are container receiving means 250 each of which is adapted to support three containers 252 of new oil. Each container receiving means 250 has a lower surface which is a portion of the lower flat support surface 212 and an upper surface 254 opposite thereto. The upper surface 254 includes a rim portion 256 which cooperates with a portion of the side wall portions 220 and 222 to form a downwardly extending cavity for receiving the containers 252. If desired, ribs may be formed on the upper surface 254 for properly positioning the containers 252.

The rigid, self-supporting means of the embodiment of FIGS. 9 and 10 is formed in a blow molding operation using a high density polyethylene having resistance to engine acids and oil characteristics. In this embodiment, the container means 210 has an overall length of about 15.5 inches, an overall width of about 13.5 inches, and an overall height of about 5.0 inches. The distance between the side walls 238 and 242 is about 14.0 inches, the distance between the side walls 240 and 244 is about 7.0 inches and the depth of each of the side walls 238, 240, 242 and 244 is about 2.0 inches.

It is contemplated that the inventive concepts herein described may be variously otherwise embodies and it is intended that the appended claims be construed to include alternative embodiments of the invention except insofar as limited by the prior art.

What is claimed is:

1. A packaging system comprising:
a plurality of containers of new oil;
a container means for providing a display stand holding said containers of new oil and a new oil filter and for receiving and storing used engine oil;
a lower flat support surface on said container means for enabling said container means to be supported in a horizontal attitude as a display stand and during use to receive used engine oil;
an oil receiving means in an upper surface opposite to said support surface of said container means including a rim portion and downwardly inwardly inclined side wall portions and having a drain opening located at the lowest portion of said upper surface for enabling used engine oil to be discharged from beneath an engine onto said upper surface within said rim portion and to flow downwardly and inwardly into said container means through said drain opening;
a removable plug means for closing said drain opening after said used engine oil has been emptied into said container means;
a plurality of support means on said upper surface having a plurality of containers of new oil supported therein during use of said container means as a display stand prior to use of said container means for receiving used engine oil drained from an engine;
each of said support means comprising a pocket formed in said upper surface and having a configuration to receive a portion of one of said containers therein;
a new oil filter support means on said upper surface having a new oil filter supported therein during use of said container means as a display stand prior to use of said container means for receiving said used engine oil from an engine; and
a transparent wrap means extending around said container means and over said containers of new oil and said new oil filter for holding said containers of new oil and said new oil filter on said container means for providing a display package and stand in a store for said containers of new oil, said new oil filter and said container means prior to the use of said container means for receiving used engine oil drained from an engine.

2. A packaging system comprising:
a plurality of containers of new oil;
a container means for providing a display stand holding said containers of new oil and for receiving and storing used engine oil;
said container means comprising a relatively rigid plastic material;
a lower flat support surface on said container means for enabling said container means to be supported in a horizontal attitude as a display stand and during use to receive used engine oil;
an upper surface opposite to said lower flat support surface;
a plurality of walls joining said lower flat support surface and said upper surface and cooperating therewith to form an inner cavity in said container means;
an oil receiving means in said upper surface including a rim portion and downwardly inwardly inclined side wall portions and having at least one drain opening located at the lowest portion of said upper surface for enabling used engine oil to be discharged from beneath an engine onto said upper surface within said rim portion and to flow downwardly and inwardly into said inner cavity of said container means through said at least one drain opening;
a removable plug means for closing said at least one drain opening after said used engine oil has been emptied into said container means;
a plurality of support means on said upper surface having a plurality of containers of new oil supported therein during use of said container means as a display stand prior to use of said container means for receiving used engine oil drained from an engine;

each of said support means comprising a pocket formed in said upper surface and having a configuration to receive a portion of one of said containers therein;

a transparent cover means extending over at least a portion of said container means and over said containers of new oil for holding said containers of new oil on said container means and for providing a display package and stand in a store for said containers of new oil and said container means prior to the use of said container means for receiving used engine oil drained from an engine; and said transparent cover means comprising a relatively rigid plastic material.

3. The invention as defined in claim 2 and further comprising:

carrying strap means secured to said container means.

4. The invention as defined in claim 3 and further comprising:

a vent opening in said container for providing a vent during filling of said container means with said used engine oil; and a removable plug means for closing said vent opening.

5. The invention as defined in claim 4 and further comprising:

at least two drain openings.

6. The invention as defined in claim 5 and further comprising:

each of said drain openings having a cross-sectional configuration smaller than the cross-sectional configuration of an oil pan plug.

7. The invention as defined in claim 5 and further comprising:

a plurality of support means extending upwardly from said lower flat support surface into said inner cavity; and each of said support means having an upper surface in contact with said upper surface of said container means.

8. The invention as defined in claim 5 wherein:

each of said drain openings having an annular, inwardly directed flange therein;

a removable member for closing each of said drain openings after said used engine oil has been emptied into said inner cavity of said container means; and each of said removable members for closing said drain openings having external threads thereon.

9. The invention as defined in claim 8 and further comprising:

a conical surface leading into each of said drain openings;

a complementary conical surface on each of said removable members for closing said drain openings; and said external threads and said annular inwardly directed flanges cooperating to force said conical surfaces and said complementary conical surfaces together to form a seal for each of said drain openings.

10. The invention as defined in claim 4 and further comprising:

a plurality of spaced apart ribs projecting outwardly on said upper surface; and said spaced apart ribs being located so as to support at least one container for new oil.

11. The invention as defined in claim 10 and further comprising:

at least two drain openings;

each of said drain openings having a cross-sectional configuration smaller than the cross-sectional configuration of an oil pan plug;

each of said drain openings having an annular, inwardly directed flange therein;

a removable member for closing each of said drain openings after said engine oil has been emptied into said inner cavity of said container means;

each of said removable members for closing said drain openings having external threads thereon;

a conical surface leading into each of said drain openings;

a complementary conical surface on each of said removable members for closing said drain openings; and said external threads and said annular inwardly directed flanges cooperating to force said conical surfaces and said complementary conical surfaces together to form a seal for each of said drain openings;

a plurality of support means extending upwardly from said lower flat support surface into said inner cavity; and each of said support means having an upper surface in contact with said upper surface of said container means.

12. A disposable container for the collection of used engine oil while draining used oil from an engine and for the support and display of containers of new oil prior to use for collection of used engine oil comprising:

a plurality of containers of new oil;

a container means for receiving and storing used engine oil;

said container means comprising a relatively rigid plastic material;

a lower flat support surface on said container means for enabling said container means to be supported on a horizontal surface beneath an oil pan of a car to receive used engine oil therefrom;

an upper surface opposite to said lower flat support surface;

an oil receiving means in said upper surface of said container means including a rim portion and downwardly inclined side wall portions integral with said rim portion and said upper surface and having at least one drain opening located at the lowest point of said upper surface for enabling used engine oil discharged from said oil pan onto said upper surface to flow downwardly and inwardly into said inner cavity of said container means through said drain opening;

a plurality of walls integral with said lower flat support surface and said rim portion and cooperating therewith to form an inner cavity in said container means for holding used engine oil;

a pair of opposite side ledges comprising at least portions of two opposite walls of said plurality of walls;

a recess formed in each of said ledges and having a support surface for supporting a plurality of said containers of new oil;

a first removable member for closing said at least one drain opening after said used engine oil has been emptied into said container means;

a vent opening in said container means; and a second removable member for closing said vent opening after said used engine oil has been emptied into said container means.

13. The invention as defined in claim 12 and further comprising:
transparent cover means extending over at least a portion of said container means and over said containers of new oil for providing a display package and stand in a store for said containers of new oil and said container means.

14. A disposable container for the collection of used engine oil while draining used oil from an engine and for the support and display of containers of new oil prior to use for collection of used engine oil comprising:
a plurality of containers of new oil;
a container means for receiving and storing used engine oil;
said container means comprising a relatively rigid plastic material;
a lower flat support surface on said container means for enabling said container means to be supported on a horizontal surface beneath an oil pan of a car to receive used engine oil therefrom;
and upper surface opposite to said lower flat support surface;
an oil receiving means in said upper surface of said container means including a rim portion and downwardly inclined side wall portions integral with said rim portion and said upper surface and having at least one drain opening located at the lowest point of said upper surface for enabling used engine oil discharged from said oil pan onto said upper surface to flow downwardly and inwardly into said inner cavity of said container means through said drain opening;
a plurality of walls integral with said lower flat support surface and said rim portion and cooperating therewith to form an inner cavity in said container means for holding used engine oil;
at least one support pillar means having a significant surface area for contacting said upper surface and limiting movement of said upper surface toward said lower flat support surface in response to forces applied to said upper surface;
said support pillar means being integral with said lower flat support surface and having a continuous surface;
support means on said upper surface for supporting said plurality of containers of new oil during use of said container means as a display stand prior to use of said container means for receiving used engine oil drained from an engine;
a first removable member for closing said at least one drain opening after said used engine oil has been emptied into said container means;
a vent opening in said container means;
a second removable member for closing said vent opening after said used engine oil has been emptied into said container means; and
transparent cover means extending over at least a portion of said container means and over said containers of new oil for providing a display package and stand in a store for said containers of new oil and said container means.

15. The invention as defined in claim 14 and further comprising:
a plurality of support means on said upper surface, said support means having dimensions so that containers of new oil may be nested therein.

* * * * *